March 17, 1959     R. CHANDLER     2,878,108
REACTORS
Filed Nov. 12, 1953

INVENTOR:
RICHARD CHANDLER
BY Morgan, Finnegan, Durham & Pine
ATTORNEYS

United States Patent Office 2,878,108
Patented Mar. 17, 1959

2,878,108

REACTORS

Richard Chandler, Feltham, England, assignor to The British Petroleum Company Limited Application November 12, 1953, Serial No. 391,695

Claims priority, application Great Britain November 19, 1952

5 Claims. (Cl. 23—288)

This invention relates to an improved reactor suitable for effecting reaction between one or more reactants in the gaseous phase and one or more reactants in the liquid phase.

It is an object of the present invention to provide an improved reactor for effecting exothermic or endothermic reactions between one or more reactants in the gaseous phase and one or more reactants in the liquid phase. It is a further object to provide a reactor in which the gas flow rate/gas residence time relationship may be subjected to controlled variation, thereby imparting improved flexibility to the reaction control. Other objects will appear hereinafter.

According to the invention, there is provided a multi-tubular reactor comprising a plurality of reaction tubes which, in the operating position of the reactor, are substantially vertical, the upper ends of said tubes passing through an upper tube plate and the lower ends of said tubes passing through and extending beyond a lower tube plate, the portion of the tubes between the lower and upper tube plates being enclosed in a shell provided with inlet and outlet means, whereby the external surfaces of said tubes may be contacted with a heat exchange medium circulated within said shell, the reactor being bounded below the lower tube plate and above the upper tube plate to provide enclosed chambers, said chambers being provided with means for the introduction of reactants and means for the withdrawal of products, respectively.

Preferably the lower ends of at least some of the reaction tubes are provided with gas distributing means, whereby, in operation, a stream of small bubbles of the gaseous phase reactant is caused to ascend through the liquid phase reactant within each tube, provided with said means, in proximity to the wall of said tube.

The gas distributing means may take the form of cut away sections at or near the lower ends of the tube. Alternatively the lower ends of the tube may be fitted with porous rings or plugs, for example, of sintered metal, ceramic material, wire gauze or of fibrous material.

In operation, the feed, which is a mixture of a gaseous phase reactant, passes into the bottom chamber of the reactor, the liquid phase reactant flowing thence into each tube through its lower end and the gaseous phase reactant collecting in the space around the extensions of the tubes below the tube plate, and thence bubbling up each tube through the gas distributing device. An advantage of this method lies in the fact that the distributing device is unlikely to become choked as it is subject to the washing action of the liquid phase reactant of the reaction mixture entering the tube. A further advantage lies in the simplicity of the feed connections to the base of the reactor. Yet another advantage lies in the fact that the stream of small bubbles of gas pass up near the walls of the tubes, provided with gas distributing means, and the reaction can take place adjacent to the surface through which heat is being removed or supplied by means of the heat exchange medium. Yet another advantage lies in the fact that the gas flow rate may be varied over a wide range without altering appreciably the pressure of the gas.

In a modification of this type of reactor there is also provided at least one down flow tube, substantially parallel to the reaction tubes, said down flow tube passing through the upper and lower tube plate and terminating at its lower end below the ends of the reaction tubes. The liquid in a reactor of this type will circulate up the reaction tubes through which gas is passing and down the down-flow tubes extending into the liquid in the bottom chamber of the reactor, and is especially suitable for use in cases wherein the gas dissolves with relative ease in the reaction mixture but wherein the reaction in the liquid phase is relatively slow.

In a further modification of the reactor, at least one vertical baffle is provided within the lower chamber, being attached to the lower tube plate, whereby the upper portion of the lower chamber is divided into at least two compartments, means being provided for the separate introduction of gaseous reactant to each of said compartments. The compartments can be interconnected below the level of the liquid.

By adjusting the amount of gas fed to each compartment, the liquid and gas residence times in the reactor can be varied. With the gaseous feed passing to both or all of the compartments in the bottom chamber of the reactor, bubbles of gas of a relatively small size will pass up the tubes provided for gas flow and, because they are small, these bubbles will travel relatively slowly through the liquid in the tubes. Thus the residence time of the gas in the reactor will be relatively long. If now the gaseous feed is passed to one, or a smaller number than before, of the compartments in the bottom chamber of the reactor, but at the same total rate as before, the bubbles of gas being larger will travel faster and the residence time of the gas will be shorter and that of the liquid correspondingly longer.

Alternatively, it may be desirable to alter the gas flow, for example by recycling more or less gas, while maintaining the residence time constant. This may be done by altering the number of compartments to which gas is fed in the bottom chamber of the reactor.

The reactors according to the present invention are particularly suitable for carrying out either exothermic reactions or endothermic reactions. In the former case, a coolant is circulated in the reactor shell, while in the latter case, a heating medium is circulated. In either case, an improvement may be effected in the control of reactions by the use of the present reactor in consequence of its characteristic features whereby the initial stage of the reaction takes place in the sections of the reactor tubes which are not in contact with the heat exchange medium. Thus in an endothermic reaction the temperature of the reaction mixture in the bottom few inches of the tubes will be high, thereafter falling rapidly to a minimum and thereafter gradually rising. In an exothermic reaction the temperature of the reaction mixture will be initially low, thereafter rising rapidly to a maximum before falling gradually along the length of the tubes. It is believed that these temperature characteristics are, in fact, a result of the time lag caused by the gas having to dissolve in the reaction mixture, followed by a rapid initial rate of reaction which falls away as the concentrations of reactants and products approach equilibrium values. The length of the extension of the reactor tubes below the bottom tube plate can be made so that the minimum temperature (for endothermic reactions) or maximum temperature (for exothermic reactions) is reached just above the bottom tube plate where the heating or cooling medium is introduced into the shell. The velocity of the medium may be made greater where the greatest transfer of heat is required, by means of baffles.

The reactor according to the present invention may be used for effecting any of a wide variety of chemical reactions for example halogenation, hydrogenation, oxidation, hydroformylation, alkylation and polymerization, of which the following are specific examples:

(1) The Oxo reaction between propylene, carbon monoxide and hydrogen with cobalt carbonyl catalyst to make butyraldehydes.

(2) Oxidation with air or oxygen of light hydrocarbon mixtures to make fatty acids.

(3) Air blowing of vegetable oils.

The invention is illustrated but in no way limited by the accompanying Figures 1–9.

Figure 1:
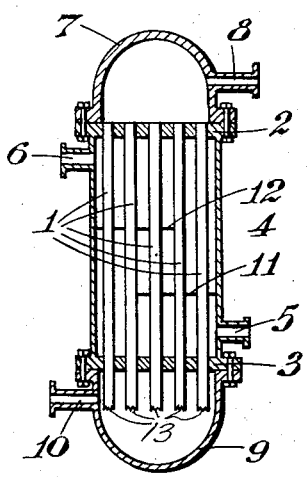
Figures 1–3 illustrate three types of reactor according to the present invention.

With reference to Fig. 1:

The reactor comprises a plurality of parallel vertical reaction tubes 1 (five shown), attached at their upper ends to a tube plate 2 and, near their lower ends, passing through tube plate 3 to at least a common level therebelow. Tube plates 2 and 3 constitute end sections to a reactor shell, bounded by outer wall 4 having attached thereto input and offtake pipes 5 and 6 respectively for circulating a heat exchange medium through the reactor shell. To tube plate 2 is bolted domed casing 7 having a product offtake pipe 8 attached thereto. To tube plate 3 is bolted domed vessel 9 having attached thereto, reactant input pipe 10.

Tubes 1 are provided, at their lower extremities, with gas distributing means which, as shown, are in the form of serrations 13. Baffles 11 and 12 are provided within the reactor shell 4 for guiding and directing the heat exchange medium over the tubes 1. In operation, a mixture of a gaseous phase reactant and a liquid phase reactant which constitutes the feed, is passed through the reactant inlet pipe 10 into the interior of domed vessel 9 which forms the bottom chamber of the reactor. A pool of the liquid phase reactant collects in the bottom chamber and flows thence up the reaction tubes 1. The gaseous phase reactant also collects in this bottom chamber above the pool of liquid therein, thus establishing a gas zone above the lower ends of the reaction tubes 1 and below the lower tube plate 3. When the level of the pool of liquid phase reactant tends to rise to a level which would cover the gas distributing means formed by the serrations 13 at the bottom ends of the tubes 1, the gaseous phase reactant introduced into the bottom chamber and collecting in the overlying gas zone, acts to force liquid from the pool in the bottom chamber, up the tubes 1 at the lower ends of the tubes. Thus, a liquid/gas interface is maintained in the bottom chamber at the level of the gas distributing means, and since this means is never completely covered or completely free of liquid contact, a series of "ports" are maintained around the lower end of each reaction tube and thus provide a means of gas distribution. In consequence a stream of small bubbles of the gaseous phase reactant is caused to ascend continuously through the liquid phase reactant within each tube 1 in proximity to the wall of the tube. Reaction between the gaseous phase reactant and the liquid phase reactant can take place therefore adjacent to the surface of the tubes 1 through which heat is being removed or supplied by means of the heat exchange medium which enters the shell 4 through the input pipe 5 and leaves through the off-take pipe 6.

Figure 2:
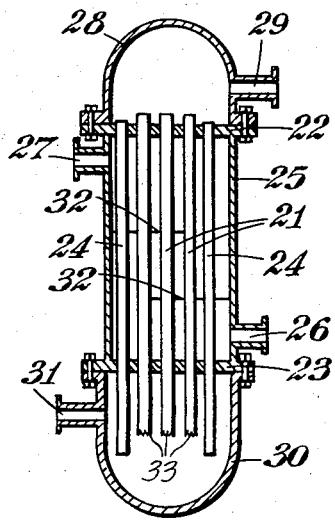

With reference to Fig. 2:

The reactor comprises a plurality of parallel vertical reactor tubes 21 (three shown) attached near their upper ends to tube plate 22 and, extending a short distance above said plate 22 and, near their lower ends, passing through tube plate 23 to at least a common level therebelow. The reactor also comprises a plurality of parallel vertical downflow tubes 24 (two shown) attached near their upper ends to said tube plate 22 and terminating below the level of the upper ends of tubes 21, said tubes 24 also passing through tube plates 23. Tubes 21 extend below tube plate 23 and are provided, at their lower extremities, with gas distributing means which, as shown, are in the form of serrations 33. Downflow tubes 24 extend below said tube plate 23 and terminate at a level below the lower extremities of reaction tubes 21. Tube plates 22 and 23 constitute end sections to a reactor shell, bounded by outer wall 25 having attached thereto input and offtake pipes 26 and 27 respectively for circulating a heat exchange medium through the reactor shell. To tube plate 22 is bolted domed casing 28 having a product offtake pipe 29 attached thereto. To tube plate 23 is bolted domed vessel 30 having attached thereto, reactant input pipe 31. Baffles 32 are provided within the reactor shell 4 for guiding and directing the heat exchange medium over the reaction tubes 21 and downflow tubes 24. In operation, the same principles which characterize the operation of the reactor of Fig. 1 will obtain, with the added feature that liquid which passes up the reaction tubes 21 through which the gas is passing will, upon entry into the upper chamber formed by the domed casing 28, pass, in part at least, down the downflow tubes 24 extending into the liquid in the bottom chamber of the reactor. It will be apparent that the density of the liquid in the downflow tubes 24 will be greater than the density of liquid, mixed with gas, in the reaction tubes 21. In consequence, a cycle of liquid will be set up, prolonging the contact time of liquid in the reactor.

Figure 3:
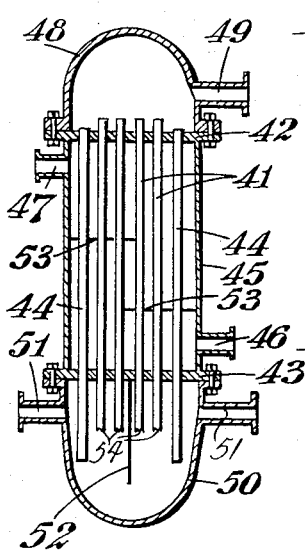

With reference to Fig. 3:

The reactor comprises a plurality of parallel vertical reaction tubes 41 (four shown) attached near their upper ends to tube plate 42, extending a short distance above said plate 42 and, near their lower ends, passing through tube plate 43 to at least a common level therebelow. The reactor also comprises a plurality of parallel vertical downflow tubes 44 (two shown) attached near their upper ends to said tube plate 42 and terminating below the level of the upper ends of tubes 41, said tubes 44 also passing through plate 43. Tubes 41 extended below tube plate 43 are provided, at their lower extremities with gas distributing means which, as shown, are in the form of serrations 54. Tubes 44 extend below said tube plate 43 and terminated at a level below the lower extremities of tubes 41. Tube plates 42 and 43 constitute end sections to a reactor shell bounded by outer wall 45 having attached thereto input and offtake pipes 46 and 47 respectively for circulating the heat exchange medium through the reactor shell. To tube plate 42 is bolted domed casing 48 having a product offtake pipe 49 attached thereto. To tube plate 43 is bolted domed vessel 50 having attached thereto individual reactor input pipes 51. Tube plate 43 has attached thereto and downwardly depending therefrom a vertical baffle 52 terminating below the level of tubes 44 and effectively dividing the chamber within casing 50 into two compartments. Baffles 53 are provided within the shell 45 for guiding and directing the heat exchange medium over the tubes 41 and 44. In operation, the same principles which characterize the operation of the reactor of Fig. 2, will obtain, with the further feature that the separate input pipes 51 enable the separate introduction of gaseous reactant with liquid reactant to each of the two compartments into which the chamber within casing 50, is divided. By adjusting the amount of gas fed to each compartment, the liquid and gas residence time can be varied. With the gaseous feed passing through both input pipes 51 into both compartments, bubbles of gas of a relatively small size will pass up the tubes 41 and, because they are small, these bubbles will travel relatively slowly through the liquid in these tubes. Thus the residence time of the gas in the reactor will be relatively long. If now the gas feed is passed to only one of the compartments of the reactor through one of the pipes 51, but at the same total rate as before, the bubbles of gas being larger will travel faster and the residence time will be shorter and that of the liquid correspondingly longer. Figs. 4 to 9 illustrate different gas distributing means which may be employed at the lower extremities of tubes 1, 21 and 41 described above.

Figure 4:
Figures 4–9 illustrate different gas distributing devices which may be employed at the lower ends of the reactor types.
Figure 5:
Figure 6:
Figure 7:
Figure 8:
Figure 9:

In Figs. 4 and 5 distribution is controlled by serrations as shown. Fig. 6 illustrates a system of inlet ports. Fig. 7 depicts a porous ring, attached to the lower edge of the tube wall, through which ring reactant gas permeates. Fig. 8 depicts a tapered, serrated tube end. Fig. 9 illustrates a tapered porous plug.

I claim:

1. A multi-tubular reactor for effecting reactions, between at least one reactant in the gaseous phase and at least one reactant in the liquid phase, which necessitate for their control, the transference of heat between the reactants and a heat exchange medium, said reactor comprising a plurality of reaction tubes which, in the operating position of the reactor, are substantially vertical, the upper ends of said tubes passing through an upper tube plate and the lower ends of all of said tubes passing through and extending beyond a lower tube plate to at least a common level therebelow, the portion of the tubes between the lower and upper tube plates being enclosed in a shell, said shell being provided with inlet and outlet means, whereby the external surfaces of said tubes may be contacted with a heat exchange medium circulated within said shell, the reactor being bounded below the lower tube plate and above the upper tube plate by enclosed chambers provided with means for the introduction of reactants and means for the withdrawal of products, respectively, the lower ends of at least some of the reaction tubes being provided with gas distributing means, whereby, in operation, a stream of small bubbles of the gaseous phase reactant is caused to ascend through the liquid phase reactant within each tube, provided with said means, in proximity to the wall of said tube, at least one vertical baffle being provided within the lower chamber and attached to the lower tube plate, whereby the upper portion of the lower chamber is divided into at least two compartments, means being provided for the separate introduction of gaseous reactant to each of said compartments.

2. A reactor as specified in claim 1 in which there is provided at least one down flow tube, substantially parallel to the reaction tubes, said down flow tube passing through the upper and lower tube plate and terminating at its lower end below the ends of the reaction tubes.

3. A reactor as specified in claim 1 in which the shell is provided with horizontal baffles to control the path of the heat exchange medium through the shell.

4. A reactor as specified in claim 1 in which the gas distributing means consists of a porous ring attached to the lower edge of the contacting tube wall.

5. A reactor as specified in claim 1 in which the reaction tubes have the periphery of their lower ends serrated.

References Cited in the file of this patent

UNITED STATES PATENTS

| | | |
|---|---|---|
| 824,808 | Pannier | July 3, 1906 |
| 1,285,494 | Wallace et al. | Nov. 19, 1918 |
| 1,931,136 | McLaughlin et al. | Oct. 17, 1933 |
| 1,958,383 | Naucler et al. | May 8, 1934 |
| 2,017,676 | Girsewald et al. | Oct. 15, 1935 |
| 2,048,179 | Chandler | July 21, 1936 |
| 2,308,786 | Smith | Jan. 19, 1943 |
| 2,385,200 | Friedel | Sept. 18, 1945 |
| 2,511,833 | Beckel | June 20, 1950 |
| 2,532,756 | Brunjes | Dec. 5, 1950 |
| 2,580,646 | Belden | Jan. 1, 1952 |

FOREIGN PATENTS

| | | |
|---|---|---|
| 690,676 | Germany | Apr. 11, 1940 |